Nov. 2, 1937.  A. J. FISCHER  2,097,454
PURIFICATION AND UTILIZATION OF SEWAGE SLUDGE DIGESTER GAS
Original Filed Jan. 17, 1934
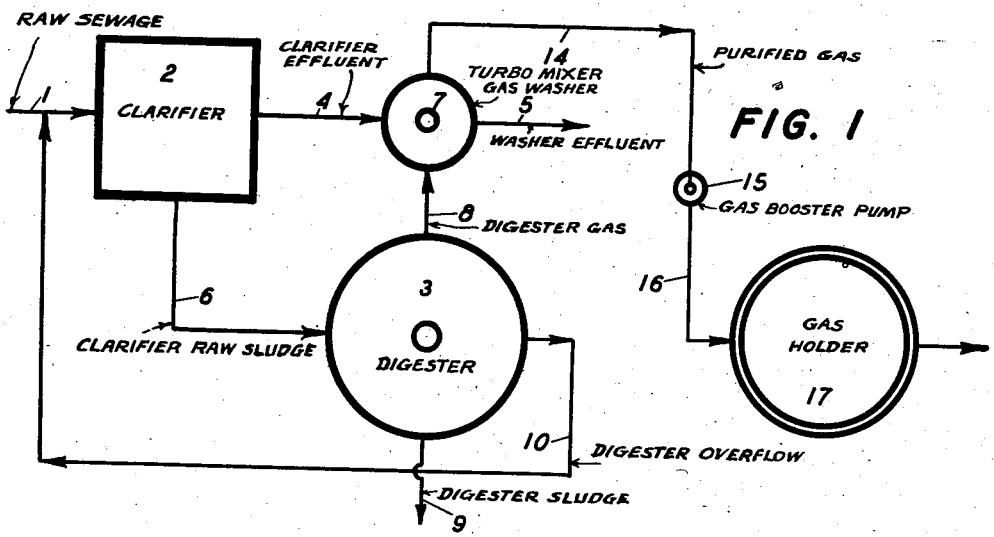
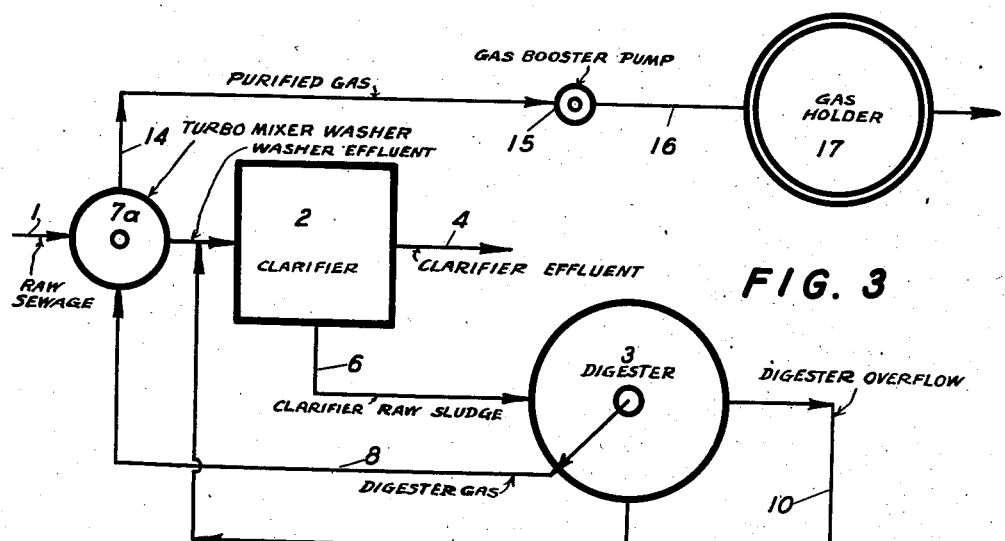
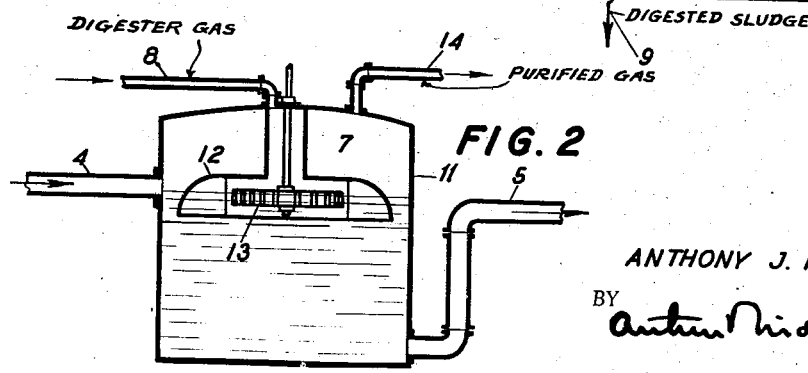
INVENTOR.
ANTHONY J. FISCHER
BY
ATTORNEY.

Patented Nov. 2, 1937

2,097,454

UNITED STATES PATENT OFFICE 2,097,454

PURIFICATION AND UTILIZATION OF SEWAGE SLUDGE DIGESTER GAS

Anthony J. Fischer, Jackson Heights, N. Y., assignor to The Dorr Company, Inc., New York, N. Y., a corporation of Delaware Application January 17, 1934, Serial No. 706,923
Renewed January 14, 1937

7 Claims. (Cl. 23—3)

The invention relates to the treatment and utilization of gas produced in and collected from sewage sludge digesters.

It is well known that the digesting of sewage sludge produces a combustible or burnable gas which may be used either as a source of power in gas engines or as a source of either heat or light. However, as a source of power when used in gas engines or as a source of heat when used in gas boilers there are experienced certain objectionable corrosive tendencies on the parts exposed to the gas and/or to the products of combustion of the gas due to a certain percentage of hydrogen sulphide ($H_2S$) content of the gas. There is also in this gas a substantial and frequently varying percentage of carbon dioxide ($CO_2$) content which in fact constitutes a diluting constituent of the gas that correspondingly cuts or holds down the heat value per unit volume of the gas. Sewage systems that utilize the sewage sludge digester gas for power purposes generally require and have as an essential part thereof a gas holder within which the gas is stored until used.

One object of the present invention is to treat sewage sludge digester gas so as to substantially remove therefrom the objectionable hydrogen sulphide ($H_2S$) or in other words so as to avoid the objectionable effects of the hydrogen sulphide ($H_2S$) particularly when such gas is used for operating a gas engine or a gas boiler.

Another object of the invention is to treat sewage sludge digester gas so as to remove all or at least a substantial percentage of the carbon dioxide ($CO_2$) content of the gas, thereby substantially increasing the heating value per unit volume of the gas and in this connection it will be apparent that an advantage of thus decreasing the carbon dioxide ($CO_2$) content is not merely to increase the heating value per unit volume and thus providing more intense combustion conditions but it also permits a reduction in storage tank requirements for a given plant.

In carrying out the invention according to a broad aspect thereof there is a washing or scrubbing of the digester gas by causing the gas and water—either pure water or water in a relatively impure condition as the liquid content of raw sewage—to be brought into intimate contact with each other for the purpose of removing due to the absorption by the water of substantially all of the hydrogen sulphide ($H_2S$) content of the gas and also of a substantial proportion of the carbon dioxide ($CO_2$) content of the gas, while according to a more specific aspect of the invention there is employed sewage—primarily because of the fact that water is available in large quantities in sewage and also because of certain alkaline constituents that are present and hasten carbon dioxide ($CO_2$) and hydrogen sulphide ($H_2S$) absorption—into which the gas is introduced and effectively brought into intimate contact with the water of the sewage as by means of a mechanical gas absorbing device known in the trade as Turbo mixer or as by any other device which will accomplish the direct intimate mixing requisite for insuring the desired absorption or extracting from the gas of the hydrogen sulphide ($H_2S$) and/or carbon dioxide ($CO_2$) because of the requisite intimate contact established between the gas and the water.

A typical analysis of sewage sludge digester gas is as follows:

| Content | General average | Percentage range may run from approximately |
|---|---|---|
| | Percentum | |
| Methane ($CH_4$) | 65 | 60 to 80 |
| Carbon dioxide ($CO_2$) | 30 | 15 to 35 |
| Nitrogen ($N_2$) | 4.4 | 2 to 10 |
| Hydrogen ($H_2$) | trace | 0 to 10 |
| Illuminants | 0.2 | 0 to 0.5 |
| Oxygen ($O_2$) | 0.2 | 0 to 0.5 |
| Hydrogen sulphide ($H_2S$) | 0.2 | 0 to 5.0 |

A further object of the invention is to collect gas produced by sewage sludge digestion and to treat said gas by bringing the same into intimate contact with incoming raw sewage—prior to the separating out from the sewage, as by sedimentation, of the sewage sludge which is later subjected to digestion—and which intimate contact as between the resulting combustible or burnable gas and the raw sewage is for the purpose of substantially removing from the gas the carbon dioxide ($CO_2$) content and the hydrogen sulphide ($H_2S$) content and the consequent production of a resulting treated gas of high heat value and which is relatively free of corrosive effects, to wit, a resulting gas which is composed largely of methane ($CH_4$).

According to another aspect of the invention the washing of the gas in order to attain the desired result can be accomplished by passing the gas in intimate contact with the effluent from the sedimentation operation and it will therefore be seen that according to a broad or basic aspect of the invention the purifying or treating of the gas may be carried out by passing the gas through any portion of the liquid of the sewage that does not pass into the digester, preferably that portion that has the higher alkaline content.

Other aspects and objects of the invention will become apparent from the description which follows. As illustrative of a method or system by or in which the invention may be realized reference is made to the accompanying drawing constituting part of this specification and in which drawing:—

Figure 1 is a diagrammatic view of a system of which the invention may be realized.

Figure 2 is a diagrammatic view illustrative of an apparatus by which gas to be purified is caused to intimately contact with the liquid—sewage—relied upon for effecting the purification of the gas.

Figure 3 is a diagrammatic view of a system by which the invention may be realized but which shows a somewhat different arrangement than that shown in Figure 1.

Reference will now be made to the drawing in detail. In said drawing like parts are referred to by like reference characters.

According to Figure 1 raw sewage enters along the path 1 and passes to the sewage treating apparatus which includes by way of illustration the settling tank 2 and a sewage sludge digester 3. Within the settling tank a sedimentation of the sewage takes place with the consequent flow of relatively clear effluent from the upper portion of the tank along one path 4 and 5 and the passage of settled sewage sludge as in the form of raw sewage sludge along another path 6 to the digester. In the path of effluent there is provided a gas mixing and gas absorbing apparatus designated by 7 which may be of the type known as the Turbo mixer gas absorber. The characteristics of such apparatus are clearly illustrated in Figure 2. Further description of this Turbo mixer 7 follows. It is in order at this time to point out however that this Turbo mixer functions to bring digester gas into intimate contact with the water effluent flowing into and through the Turbo mixer whereby certain components of the gas will be absorbed by the water and will thereby be substantially eliminated from the gas.

The sludge which is passed to the digester 3 is allowed to remain therein for a sufficient length of time and under conditions to effect the desired or required digestion thereof. This digester is preferably of the relatively closed type whereby the gas driven off or given off as the result of the digestion can be collected and passed therefrom along the path 8 into the Turbo mixer 7. The digested sludge can pass from the digester as along the path 9 for such disposal as is desired for example, to drying beds, filter or other place of disposition and the digester overflow liquor can pass as along the path 10 to any place desired for the disposal of the same for example, back into the raw sewage stream. The gas resulting from the digestion contains as has been previously pointed out a large percentage of methane ($CH_4$), a substantial percentage of carbon dioxide ($CO_2$), nitrogen ($N_2$) to a certain extent but not a particularly large extent and hydrogen sulphide ($H_2S$) to an appreciable quantity bearing in mind the characteristics of that particular gas, and generally certain other constituents to a greater or lesser degree. The gas produced or given off as a result of the digestive process is suitable for producing power in a gas engine or for producing heat or even light but as previously indicated due to the hydrogen sulphide ($H_2S$) characteristic it has certain detrimental effects upon the parts of a gas engine or boiler due to the corrosive characteristics which are inherent in such gas, while the carbon dioxide ($CO_2$) in the gas although corrosive is chiefly looked upon as a diluent. It will therefore become apparent that if the carbon dioxide ($CO_2$) is eliminated the gas will have a correspondingly higher heating or power producing value per unit of volume, also that if the hydrogen sulphide ($H_2S$) is eliminated the detrimental effect of that particular gas will be eliminated or avoided when the sewage sludge digester gas is employed for producing power in a gas engine or boiler. Both the carbon dioxide ($CO_2$) and the hydrogen sulphide ($H_2S$) are readily soluble in or absorbable by water and according to the present invention there is contemplated the passing of the digester gas in direct contact with water as by passing the gas in intimate contact with raw sewage or with the effluent from a settling tank or in fact the water effluent from any portion of the sewage treating process whereby because of this intimate contacting of the gas with the water there will be a substantial elimination from the sewage sludge digester gas of the objectionable hydrogen sulphide ($H_2S$) and of the diluting carbon dioxide ($CO_2$).

In Figure 2 a Turbo mixer which can be relied upon for effecting this intimate mixing or intimate bringing of the gas in contact with water is illustrated and therefrom it will be seen that the Turbo mixer 7 comprises a closed tank 11 into which the water is supplied as an effluent from the settling tank along the pipe or path 4 and from this tank 11 the water charged to a greater or lesser extent with hydrogen sulphide ($H_2S$) or carbon dioxide ($CO_2$) passes along the path 5. The gas to be treated enters along the path or pipe 8 and passes to the upper portion of a bell shaped member 12 the lower portion of which continuously remains submerged in the liquid within the mixing tank 11. An externally driven impeller 13 forcibly projects the water in intimate contact with the gas which is continually supplied into the space on the underside of the bell shaped member 12 with the result that there is realized the desired intimate contact of the water and the gas and an intimate mixing of the gas into and throughout the body of water, the substantially purified sewage sludge gas ultimately passes from this Turbo mixing apparatus 7 by means of the pipe or path 14 to the place where it is stored or ultimately used. Reverting now to Figure 1 it will be seen that in the system as illustrated this pipe or path 14 leads to the booster pump 15 which in turn pumps the gas under pressure along the path 16 into a gas holder 17 from which the gas passes to its point of utilization as to the gas engine or heating equipment.

In connection with the system of Figure 3 it is to be noted that a Turbo mixer 7a is employed which functions in substantially the same manner as the Turbo mixer 7 previously described. The main difference between the system of the Figure 1 and the system of Figure 3 resides in the fact that Figure 3 has the Turbo mixer 7a placed in the influent line 1 leading to the settling tank 2 instead of to the effluent 4—5 leading from the sedimentation tank as is the case in Figure 1. The effect however of the raw sewage supplied to and through the Turbo mixer 7a upon the gas which is washed through the instrumentality of this Turbo mixer is the same as the washing operation which is carried out in and by the Turbo mixer 7 of Figure 2.

From what has preceded it will be manifest that in the operating of each system herein described there is carried out a method which results in the production of the sewage sludge digester gas having the general characteristics herein outlined, that this gas in order to purify the same and rid it of certain constituents is intimately brought into contact with water—preferably the water supplied either directly as raw sewage or indirectly as so-called sewage effluent from the sewage stream, whereby the gases having certain undesirable characteristics are eliminated and the ultimate employment of the thus purified or treated sewage sludge digester gas as by storing the same prior to ultimate use as in a gas engine employed in the operating of different parts of the system.

As a consequence of the gas washing treatment according to this invention economies are effected: by the preservation of corrodible gas conducting, gas storing, and gas utilizing equipment; by the production of an ameliorated gas of increased caloric value; by the saving of gas storage or gasholder space; by the saving in the power required for boosting the gas to a desired storage pressure, as effected by the reduction in volume to be pumped; and by the saving effected in that large amounts of wash liquid are made available at substantially no extra cost in the form of the sewage liquid on hand. It can hence be said that the improvements effected by this invention constitute a measure of practical plant operation in a sewage treatment system.

Each system as illustrated has been described as directly carrying out a settling operation upon raw sewage but it will be manifest that as far as the present invention is concerned the settling tank 2 may be one which is directly employed for effecting the sedimentation of activated sludge mixed liquor or in fact of any form of sewage sludge supplied thereto.

The essential feature of the invention revolves about the deliberate employment of sewage sludge gas and of the treatment of the same in order to remove certain types of gas constituents therefrom prior to the ultimate use of the gas for heating, lighting or power purposes.

What is claimed is:

1. In the utilization of burnable gas resulting from the digestion of sewage sludge the method which comprises collecting and thereafter passing the gas in intimate contact with raw sewage so as to substantially remove from the gas the hydrogen sulphide ($H_2S$) and carbon dioxide ($CO_2$) content of the gas.

2. In the utilization of burnable gas resulting from the digestion of sewage sludge the method which comprises collecting and thereafter passing the gas in intimate contact with effluent obtained from sewage clarification so as to substantially remove from the gas the hydrogen sulphide ($H_2S$) and carbon dioxide ($CO_2$) content.

3. In the utilization of burnable sewage-sludge gas the method which comprises causing the gas and sewage to intimately contact to wash from the gas hydrogen sulphide ($H_2S$) and carbon dioxide ($CO_2$) and thereafter collecting and storing the gas for subsequent use.

4. The treatment of sewage-sludge gas preparatory to utilizing the same as a source of fuel by passing the gas into contact with sewage to absorb the carbon dioxide ($CO_2$) whereby the gas remaining is composed largely of methane ($CH_4$).

5. The treating of burnable sewage-sludge gas which as produced comprises at least approximately 60% of methane ($CH_4$), carbon dioxide ($CO_2$) as a substantial portion of the remaining percentage of the gas, a certain percentage of nitrogen ($N_2$) and a certain percentage of hydrogen sulphide ($H_2S$), by causing the gas and sewage to intimately contact for a time sufficient to substantially remove the carbon dioxide ($CO_2$) and hydrogen sulphide ($H_2S$) and thereafter collecting and storing the treated gas preparatory to using the same.

6. In the utilization of burnable gas resulting from the digestion of sewage sludge, the method which comprises collecting and thereafter washing the gas by intimate contact with sewage effluent in order to effect the absorption of undesirable gaseous constituents from the gas by said effluent.

7. In the utilization of burnable gas resulting from the digestion of sewage sludge, the method which comprises collecting and thereafter washing the gas by intimate contact with sewage liquid in order to effect the absorption of undesirable gaseous constituents from the gas by said sewage liquid.

ANTHONY J. FISCHER.